United States Patent [19]

Haug et al.

[11] Patent Number: 4,971,086

[45] Date of Patent: Nov. 20, 1990

[54] METHOD OF TREATING FRIABLE ASBESTOS ROOFING MATERIAL

[76] Inventors: John M. Haug, 8812 N. 47th Pl., Phoenix, Ariz. 85028; Daniel J. Handeland, 7120 N. 173rd Ave., Waddell, Ariz. 85355

[21] Appl. No.: 443,557

[22] Filed: Nov. 29, 1989

[51] Int. Cl.$^5$ .............................................. B08B 7/00
[52] U.S. Cl. .......................................... 134/4; 134/6; 134/21; 134/42; 106/244; 427/154
[58] Field of Search ................... 134/14, 6, 42, 21, 39, 134/4; 106/169, 244; 252/88, 74, 18, 19; 427/154

[56] References Cited

U.S. PATENT DOCUMENTS

| | | | |
|---|---|---|---|
| 4,477,490 | 10/1984 | Weisberg | 427/136 |
| 4,632,847 | 12/1986 | Lomasney et al. | 427/154 |
| 4,693,755 | 9/1987 | Erzinger | 134/6 |
| 4,699,666 | 10/1987 | Tidquist et al. | 134/6 |
| 4,812,700 | 3/1989 | Natale | 134/21 |
| 4,817,644 | 4/1989 | Holmes et al. | 134/6 |
| 4,872,920 | 10/1989 | Flynn et al. | 134/21 |

OTHER PUBLICATIONS

The Chemical Formulary, pp. 477–478 and p. 471, vol. 1, 1933, New York, D. Van Nostrand Co., Inc.

*Primary Examiner*—Asok Pal
*Attorney, Agent, or Firm*—Charles E. Cates; Frank T. Barber

[57] ABSTRACT

Asbestos containing materials which have become friable and thus hazardous to health can be rendered non-friable by treatment with a lipophilic material, such as a triglyceride oil having non-polar or slightly polar characteristics. The method of the invention is particularly applicable to the treatment of asbestos-containing roofs which are friable and which, without treatment, would be required to be removed using the stringent, expensive protocol which is specified under the Federal Asbestos Abatement Guidelines for removal of friable asbestos roofs.

21 Claims, No Drawings

METHOD OF TREATING FRIABLE ASBESTOS ROOFING MATERIAL

BACKGROUND OF THE INVENTION

Exposure to asbestos is generally accepted to be a health hazard. Asbestos materials that tend to become friable are regarded as particularly hazardous because the asbestos becomes easily entrained into the air as the materials deteriorate with age. Concern about health issues and environmental contamination by asbestos has promulgated numerous Federal Regulations dealing with the subject. It has therefore become important to develop ways of eliminating the contamination.

Materials used in roofing for years have contained asbestos The asbestos-containing materials used in roofing are the type that tend to become friable and are unsafe. The friable materials are dealt with by encapsulation or removal.

Encapsulation permits the asbestos-containing material to remain safely in place for longer periods of time than it otherwise could. However, encapsulation represents a temporary measure since sealants also will deteriorate with time.

Because no adequate chemical removal procedures have been developed, removal is accomplished by hand held impact and cutting tools. Asbestos-containing materials tend to pulverize upon impact or scraping rather than shear off in large pieces. Consequently, hand labor requirements are greatly increased and heavy asbestos dust contamination results.

One method of dealing with the dust contamination problems is by a simple wetting operation. Water is sprayed on the asbestos-containing material in order to lower the friability. Water spraying is not a satisfactory solution. At best, water provides a slow, incomplete penetration of the asbestos-containing material. Water run-off may carry asbestos fibers to other areas and increase the safety hazard.

Erzinger, Pat. No. 4,693,755 discloses a method for removing asbestos-containing materials from their substrate. The method includes applying a composition containing a cellulosic polymer such as hydroxypropyl cellulose to the asbestos-containing materials, allowing the cellulosic polymer containing composition time to penetrate and wet the asbestos-containing material, and removing the resulting wet asbestos-containing material by use of mechanical forces.

Tidquist, Pat. No. 4,699,666 discloses a similar method for removing asbestos-containing materials from their substrate. The patent teaches the use of a debilitant composition of water and a homopolymer of ethylene oxide having a molecular weight of from about 100,000 to about 5,000,000 and having a repeating monomeric unit with a molecular weight of 44. The composition is applied to a body of asbestos-containing insulation in sufficient quantity to thoroughly wet at least the exposed portion. The pre-wet body is then mechanically removed.

An objective of the present invention is to provide an improved method and composition for removing asbestos-containing materials.

Another objective of this invention is to provide a method for treating asbestos-containing materials in the removal process that facilitates the use of inexpensive, readily available, non-toxic material.

Still another objective of this invention is to provide a composition having an advantageously low evaporation rate and deep penetration power.

Yet still another objective of this invention is to provide a simple, effective, inexpensive method for treating asbestos-containing materials.

Other objects and advantages will become apparent upon reference to the following detailed discussions.

SUMMARY OF THE INVENTION

The present invention is based on the discovery that lipophilic materials have the capability of penetrating friable asbestos to rejuvenate the fibers and significantly reduce the friability of the asbestos material.

The invention therefore is a method for treatment of friable asbestos comprising the steps of applying a lipophilic material to the friable asbestos and allowing said material to penetrate the asbestos to provide a bonded matrix exhibiting reduced friability.

In a preferred embodiment, the invention is a method of removing a roofing material comprising an asphaltic layer and an underlying layer or layers containing friable asbestos, comprising the steps of applying a non-toxic, biodegradable lipophilic material to the asphaltic layer, allowing the material to penetrate the asphaltic layer and saturate the underlying layer to render the asbestos nonfriable, and mechanically removing the treated roofing material for disposal.

In the practice of such method, the lipophilic material not only penetrates the asphaltic layer but it also saturates the asbestos layer or layers, rejuvenating the plies of roofing material, making it pliable and free of debris, and encapsulating the asbestos fibers, rendering them non-friable. It is a significant advantage of the invention that, after treatment, the roofing material may be removed using standard methods, rather than the stringent, expensive protocol which is required under the Federal Asbestos Abatement Guidelines for removal of friable asbestos roofs.

DETAILED DESCRIPTION OF THE INVENTION

Although the invention is applicable to the treatment of friable asbestos materials in general, the preferred application of the invention involves the treatment and removal of roofing materials containing one or more layers of asbestos which has become friable, and the invention will be described in terms of such application.

In the practice of the preferred embodiment, the procedure is initiated by applying the lipophilic material to the surface of the roof. It will be understood that the standard roof of a building or other structure consists of an underlying structural layer made of a material such as wood, plywood, concrete, metal, and the like, covered by a weatherproof membrane. The membrane is ordinarily composed of a number of plies of different substances which contribute their specific properties to the impermeability, insulating and durability characteristics which are required in the membrane. Thus, the usual membrane will be composed of one or more felt layers covered by a cap layer comprising a felt saturated with asphalt and covered with pebbles, sand, or other weathering granules. In the past, it has been the underlying felt plies which sometimes contain or are made from asbestos, and it is the friability of the asbestos in these plies which creates the problems now being faced.

The lipophilic material which is spread on the surface of the roof is preferably a high molecular weight triglyceride. Corn oil, soybean oil, cottonseed oil, linseed oil, tung oil, lard, cod liver oil, coconut oil and olive oil are examples of triglycerides useful in the practice of the invention. The lipophilic material should be non-polar or slightly or weakly polar, and should have a dielectic constant below about 10, and preferably in the range from about 1.0 to 3.0. It is also advantageous for the material to be non-toxic and biodegradable. Other lipophilic materials, such as mineral oils or motor oils having the above characteristics, are useful in the invention.

The lipophilic material may be applied to the surface of the roof by any convenient method. Application can be by brush, roller, spray equipment, or any other suitable means for spreading the material in a uniform layer over the surface, to cause thorough wetting of the surface. The material should be applied at the rate of approximately,0.5 to 2 ounces per square foot of roofing surface. The invention is not limited to this range of application rates, but the advantages of the invention are reduced as the rates become higher or lower. The preferred rate is approximately 1 ounce per square foot.

After a period of time depending on the nature and thickness of the plies of the roofing membrane, but normally between 1 and 24 hours, the lipophilic material will penetrate the asphalt cap layer and saturate the plies containing the asbestos. The penetration results in numerous enhancements. The entire roofing membrane becomes rejuvenated, elastic and pliable and free from debris. The membrane regains its original black color. The asbestos fibers become coated and free from dust, and are rendered non-friable. Further, the entire membrane is bound together in a cohesive unit and can be mechanically removed along the structural interface in large pieces or strips, as opposed to becoming a dust or powder as in prior art practices. The improvements gained from the treatment would allow the roof to remain in place for an additional period of time, if desired, although the preferred embodiment involves mechanically removing the roof membrane as soon as its has been rendered non-friable. The removal may be accomplished by conventional mechanical techniques such as scraping, spading, chiseling, and the like, and the resulting debris may be collected and disposed of by conventional means.

The following examples describe specific embodiments which are illustrative of the invention but should not be interpreted as limiting the scope of the invention in any manner.

EXAMPLE 1

A test section of a roofing membrane was cut from the roof of a large commercial building in Phoenix, Arizona. The membrane consisted of a top cap ply coated with asphalt and two lower felt plies of asbestos. The test section was submitted to a testing laboratory where it was analyzed using the EPA Interim Method #600/M4-82-020 (polarized light microscopy with optical dispersion staining). Percentages of fiber types were determined using visual estimates and/or comparison to percentage standards. The test section was found to contain 20-30% chrysotile asbestos and 20-30% cellulose in each of the bottom plies, and the asbestos was found to be friable.

Next, a prior art encapsulating procedure was attempted on the same roof to determine if the friability of the asbestos could be eliminated or improved. In this procedure, a 30# felt was hot mopped with asphalt over the membrane in a test area; a test section was cut; and the section was submitted for analysis, according to the protocol described in the preceding paragraph. However, both bottom plies continued to contain friable asbestos.

Finally, the procedure of the present invention was carried out on a further test section of the same roof. In the procedure, a quantity of commercial processed soybean oil was spread over the surface of the test section at the rate of 1 ounce per square foot and allowed to set for a period of two weeks. At the end of this time, the test section was cut from the roof and submitted for analysis according to the protocol described above. The asbestos in both bottom plies was non-friable.

EXAMPLE 2

Two side-by-side test sections were cut from the roof of a pipe and steel plant in Phoenix, Arizona. The roof was found to consist of three separate roofs which had been laid, one on top of the other. One of the test sections was submitted for analysis according to the protocol described in Example 1 and was found to contain friable asbestos in the bottom layer but not in the two top layers.

The second test section was treated by spreading 3 ounces of commercial processed soybean oil over the top surface and allowing the sample to set for two weeks. When the section was analyzed according to the protocol of Example 1, none of the layers contained friable asbestos.

EXAMPLE 3

A section of the roof, known to contain friable asbestos, in a school building in Phoenix, Arizona, was swept clean and treated with a quantity of commercial processed soybean oil at the rate of 1 ounce per square foot. The oil was allowed to remain on the test area for 4 days, and then the test section was removed and analyzed according to the protocol of Example 1. The sample was found to contain 5-10% fibrous glass, 20-30% chrysotile asbestos and 10-20% cellulose. The asbestos was found to have been rendered non-friable.

EXAMPLE 4

A series of different lipophilic materials were tested to determine their effect on the friability of roofing samples known to contain friable asbestos. In the testing, 1 ounce of each treating material was spread on 12" squares of the friable roofing material and allowed to set for a period of 72 hours. The samples were then taken to the laboratory and analyzed according to the protocol described in Example 1. The test results were as follows:

| No. | Lipophilic Material | Chrysotile Content (%) | Friable or Non-friable |
| --- | --- | --- | --- |
| 1 | Soybean Oil | 20-30 | Non-friable |
| 2 | Linseed Oil | 20-30 | Non-friable |
| 3 | Tung Oil | 20-30 | Non-friable |
| 4 | Lard | 40-50 | Non-friable |
| 5 | Motor Oil | 30-40 | Non-friable |
| 6 | Cod Liver Oil | 30-40 | Non-friable |
| 7 | Corn Oil | 30-40 | Non-friable |
| 8 | Coconut Oil | 30-40 | Non-friable |
| 9 | Olive Oil | 30-40 | Non-friable |
| 10 | Neat's Foot Oil | 30-40 | Non-friable |

EXAMPLE 5

The roof of the YMCA Building in Phoenix, Arizona, was treated by the method of the present invention. Before treatment, the roof was analyzed to contain 10-20% chrysotile asbestos, 20-30% cellulose, 2-5% fibrous glass fiber, bitumen, filler and reflective paint. The asbestos tested friable.

Cottonseed oil was applied to the roof. The roof surfaces were thoroughly wet with the cottonseed oil and then allowed to stand to permit the cottonseed oil to penetrate the roofing material. Following this, test sections were analyzed, and the results of the analysis indicated that the asbestos had become non-friable.

The roofing material was then removed using conventional spading techniques, and the material thus removed was collected for disposal, preparatory to installing a new roof. During the removal, air quality samples were taken at representative locations above the roof and from the clothing of the personnel doing the work. Asbestos fiber counts well within permissible ranges were logged in all cases.

The specific examples herein set forth are to be considered as being primarily illustrative. Various changes beyond those described will, no doubt, occur to those skilled in the art; and such changes are to be understood as forming a part of this invention insofar as they fall within the spirit and scope of the appended claims.

What is claimed is:

1. A method for treatment of friable asbestos comprising the steps of applying a lipophilic material to said friable asbestos and allowing said material to penetrate said asbestos to provide a bonded matrix exhibiting reduced friability.

2. The method of claim 1 wherein said lipophilic material is selected from the group consisting of non-polar and slightly polar organic materials.

3. The method of claim 1 wherein said lipophilic material has a dielectric constant below 10.

4. The method of claim 1 wherein said lipophilic material is selected from the group consisting of high molecular weight triglycerides and mixtures thereof.

5. The method of claim 4 wherein said lipophilic material is corn oil.

6. The method of claim 4 wherein said lipophilic material is soybean oil.

7. The method of claim 1 wherein said lipophilic material is motor oil.

8. A method of removing a coating containing friable asbestos comprising the steps of applying a non-toxic, biodegradable lipophilic material to the surface of said coating, allowing said material to penetrate and saturate said asbestos, applying mechanical action to said coating, and collecting the resulting debris for disposal.

9. The method of claim 8 wherein said lipophilic material is selected from the group consisting of non-polar and slightly polar organic materials.

10. The method of claim 8 wherein said lipophilic material has a dielectric constant below 10.

11. The method of claim 8 wherein said lipophilic material is selected from the group consisting of high molecular weight triglycerides and mixtures thereof.

12. The method of claim 11 wherein said lipophilic material is corn oil.

13. The method of claim 11 wherein said lipophilic material is soybean oil.

14. The method of claim 8 wherein said lipophilic material is motor oil.

15. A method of removing a roofing material comprising an asphaltic layer and an underlying layer or layers containing friable asbestos, comprising the steps of applying a non-toxic, biodegradable lipophilic material to said asphaltic layer, allowing said material to penetrate said asphaltic layer and saturate said underlying layer to render said asbestos non-friable, and mechanically removing said treated roofing material for disposal.

16. The method of claim 15 wherein said lipophilic material is selected from the group consisting of non-polar and slightly polar organic materials.

17. The method of claim 15 wherein said lipophilic material has a dielectric constant below 10.

18. The method of claim 15 wherein said lipophilic material is selected from the group consisting of high molecular weight triglycerides and mixtures thereof.

19. The method of claim 18 wherein said lipophilic material is corn oil.

20. The method of claim 18 wherein said lipophilic material is soybean oil.

21. The method of claim 15 wherein said lipophilic material is motor oil.

* * * * *